UNITED STATES PATENT OFFICE.

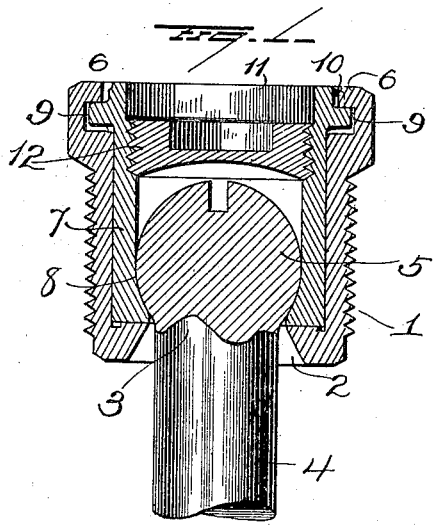
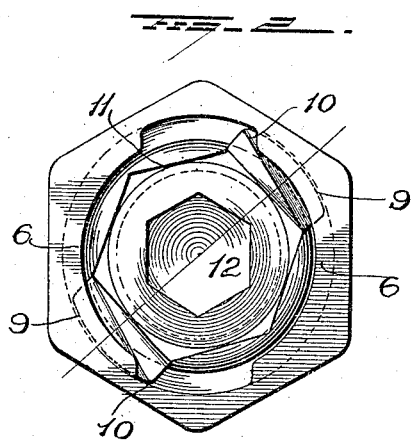

ETHAN I. DODDS, OF PITTSBURGH, PENNSYLVANIA, ASSIGNOR TO FLANNERY BOLT COMPANY, OF PITTSBURGH, PENNSYLVANIA.

STAY-BOLT STRUCTURE.

1,293,375.      Specification of Letters Patent.      Patented Feb. 4, 1919.

Application filed May 3, 1918. Serial No. 232,313.

*To all whom it may concern:*

Be it known that I, ETHAN I. DODDS, a citizen of the United States, and a resident of Pittsburgh, in the county of Allegheny and State of Pennsylvania, have invented certain new and useful Improvements in Stay-Bolt Structures; and I do hereby declare the following to be a full, clear, and exact description of the invention, such as will enable others skilled in the art to which it appertains to make and use the same.

This invention relates to improvements in staybolt structures and more particularly to means for affording the inclosed bearing for the head of the staybolt,—the object of the invention being to so construct devices of this character as to facilitate the quick and easy testing of the staybolt.

With this and other objects in view, the invention consists in certain novel features of construction and combinations of parts as hereinafter more fully described and pointed out in the claims.

In the accompanying drawings, Figure 1 is a longitudinal sectional view of a stay bolt structure embodying my invention, and Fig. 2 is a plan view.

1 represents a bushing provided at its inner end with a tapering opening 2 for the accommodation of the neck 3 of a staybolt 4, the latter having a rounded or spherical head 5. The bushing 1 is grooved interiorly near its outer end forming segmental shoulders 6 and within said bushing, a sleeve 7 is mounted to turn and provided interiorly with a curved face 8 which serves as a bearing for the rounded head 5 of the staybolt.

Near its outer end, the bearing sleeve 7 is provided with external lugs 9 adapted to become disposed behind the internal segmental shoulders 6 of the bushing and at one end of each of said lugs a shoulder 10 is formed to engage end portions of the segmental shoulders 6 and thus serve as stop means for limiting the turning movement of the sleeve. To facilitate the turning of the bearing sleeve, it may be made with an angular internal portion 11 to receive a wrench.

For the purpose of enabling the assembling of the head of the staybolt in the bearing sleeve 7 and to close said bearing sleeve over the head of the bolt, a threaded plug 12 is provided to screw into said bearing sleeve, as shown in Fig. 1.

By turning the bearing sleeve 7 until the lugs 9 shall have moved out of alinement with the segmental shoulders 6, said sleeve will be unlocked. The operator may then attempt to withdraw the sleeve from the bushing and failure in such attempt to move said sleeve outwardly will indicate that the bolt is whole.

Having fully described my invention what I claim as new and desire to secure by Letters-Patent, is:

1. In a staybolt structure, the combination with a bushing having internal segmental shoulders near its outer end, of a sleeve mounted in said bushing to turn and affording a bearing for the head of a staybolt, said sleeve provided near its outer end with lugs to engage behind said segmental shoulders, and stops on said lugs to engage said shoulders and limit the turning movement of the sleeve.

2. In a staybolt structure, the combination with a bushing having internal segmental shoulders near its outer end, of a sleeve mounted in said bushing and affording a bearing for the head of a staybolt, lugs projecting from said sleeve and adapted to engage behind the segmental shoulders in the bushing, stop means for limiting the turning of the sleeve, said stop means comprising shoulders on said lugs to engage the segmental shoulders in the bushing, and a removable plug within the sleeve so as to be disposed over and cover the head of the staybolt.

In testimony whereof, I have signed this specification in the presence of two subscribing witnesses.

ETHAN I. DODDS.

Witnesses:
S. G. NOTTINGHAM,
R. S. FERGUSON.

Copies of this patent may be obtained for five cents each, by addressing the "Commissioner of Patents, Washington, D. C."